(12) United States Patent
Sun et al.

(10) Patent No.: US 11,935,273 B2
(45) Date of Patent: Mar. 19, 2024

(54) OBJECT RECOGNITION SYSTEM AND METHOD

(71) Applicant: ELO TOUCH SOLUTIONS, INC., Milpitas, CA (US)

(72) Inventors: Yin Sun, Shanghai (CN); Haolai Zhou, Shanghai (CN); Hua Shao, Shanghai (CN)

(73) Assignee: Elo Touch Solutions, Inc., Knoxville, TN (US)

( * ) Notice: Subject to any disclaimer, the term of this patent is extended or adjusted under 35 U.S.C. 154(b) by 57 days.

(21) Appl. No.: 17/369,151

(22) Filed: Jul. 7, 2021

(65) Prior Publication Data

US 2022/0012516 A1 Jan. 13, 2022

(30) Foreign Application Priority Data

Jul. 8, 2020 (CN) .......................... 202010651765.7

(51) Int. Cl.
*G06V 10/141* (2022.01)
*G06V 10/10* (2022.01)
*H04N 23/71* (2023.01)
*H04N 23/74* (2023.01)
*H05B 45/20* (2020.01)
*H05B 47/11* (2020.01)

(52) U.S. Cl.
CPC ............ *G06V 10/141* (2022.01); *G06V 10/10* (2022.01); *H04N 23/71* (2023.01); *H04N 23/74* (2023.01); *H05B 45/20* (2020.01); *H05B 47/11* (2020.01)

(58) Field of Classification Search
CPC ...... G06V 10/141; G06V 10/10; H05B 45/20; H05B 47/11; H04N 23/74; H04N 23/71
USPC ........................................................ 348/370
See application file for complete search history.

(56) References Cited

U.S. PATENT DOCUMENTS

2020/0077005 A1\* 3/2020 Mondal .................. G06V 10/98

FOREIGN PATENT DOCUMENTS

EP 1433998 A1 \* 6/2004 ............. A61B 90/30

\* cited by examiner

*Primary Examiner* — Joel W Fosselman
(74) *Attorney, Agent, or Firm* — Sterne, Kessler, Goldstein & Fox P.L.L.C.

(57) ABSTRACT

The present disclosure relates to an object recognition system and method. The system comprises: an illumination apparatus configured to generate an illumination light for illuminating an object; a lighting sensor configured to acquire a first lighting parameter of an ambient light in a recognition environment in which the object is located; an imaging apparatus configured to acquire imaging data of the object; a first controller communicatively connected with the illumination apparatus and the lighting sensor, and configured to control a second lighting parameter of the illumination light generated by the illumination apparatus according to the first lighting parameter, until the first lighting parameter of the ambient light is within a preset parameter range; and a processor communicatively connected with the imaging apparatus and the first controller, and configured to recognize the object according to imaging data of the object under the ambient light within the preset parameter range.

19 Claims, 3 Drawing Sheets

OBJECT RECOGNITION SYSTEM AND METHOD

CROSS REFERENCE TO RELATED APPLICATION

The present disclosure claims the benefit of CN Application No. 202010651765.7, filed Jul. 8, 2020, titled "Object Recognition System And Method", the content of which is hereby incorporated by reference in its entirety.

TECHNICAL FIELD

The present disclosure relates to the field of automatic recognition technologies, and in particular, to an object recognition system and method.

BACKGROUND

In the automatic recognition of an object, photographs thereof may be taken, and then image processing and analysis is performed on the photographs, thereby recognizing information about category, size, position, and the like of the object. Thus it can be seen that the shooting effect of the photographs has a great influence on a final recognition result. However, the imaging effect of the photographs may deteriorate due to a change in illuminating conditions in the environment where the object is located, causing difficulty in the automatic recognition.

SUMMARY

It is one of the objectives of the present disclosure to provide an object recognition system and method.

According to a first aspect of the present disclosure, there is provided an object recognition system comprising:

an illumination apparatus configured to generate an illumination light for illuminating an object;

a lighting sensor configured to acquire a first lighting parameter of an ambient light in a recognition environment in which the object is located;

an imaging apparatus configured to acquire imaging data of the object;

a first controller communicatively connected with the illumination apparatus and the lighting sensor, and configured to control a second lighting parameter of the illumination light generated by the illumination apparatus according to the first lighting parameter, until the first lighting parameter of the ambient light is within a preset parameter range; and a processor communicatively connected with the imaging apparatus and the first controller, and configured to recognize the object according to imaging data of the object under the ambient light within the preset parameter range.

In some embodiments, the illumination apparatus comprises:

a first light emitting assembly configured to generate a first radiated light having a first color temperature and a first light intensity, wherein the first light intensity is adjustable; and a second light emitting assembly configured to generate a second radiated light having a second color temperature and a second light intensity, wherein the second light intensity is adjustable and the second color temperature is lower than the first color temperature.

In some embodiments, the first light emitting assembly and the second light emitting assembly are configured for illumination.

In some embodiments, the illumination apparatus further comprises a third light emitting assembly configured to generate a third radiated light having a preset color and a third light intensity, wherein the preset color and the third light intensity are adjustable.

In some embodiments, the third light emitting assembly is configured to indicate current status information.

In some embodiments, the first light emitting assembly comprises a plurality of first light emitting diodes connected in parallel configured to generate a first white light having the first color temperature; and the second light emitting assembly comprises a plurality of second light emitting diodes connected in parallel configured to generate a second white light having the second color temperature.

In some embodiments, the third light emitting assembly comprises a plurality of third light emitting devices connected in parallel configured to generate a chromatic light.

In some embodiments, the third light emitting device comprises:

at least one third light emitting diode, wherein the third light emitting diode is configured to generate a red light;

at least one fourth light emitting diode, wherein the fourth light emitting diode is configured to generate a green light; and at least one fifth light emitting diode, wherein the fifth light emitting diode is configured to generate a blue light.

In some embodiments, the third light emitting device is disposed in a staggered manner with respect to the first light emitting diode and the second light emitting diode.

In some embodiments, the plurality of third light emitting devices are distributed in a density less than that of the plurality of first light emitting diodes, and less than that of the plurality of second light emitting diodes.

In some embodiments, the illumination apparatus further comprises:

one or more input ports each configured to receive a respective input signal; and an output port electrically connected with at least one of the one or more input ports and configured to output an output signal, wherein the output signal comprises at least a portion of an input signal received by the input port electrically connected with the output port.

In some embodiments, the output port is configured to be electrically connected with at least one input port of another illumination apparatus.

In some embodiments, the one or more input ports comprises:

a first input port electrically connected with the first light emitting assembly and configured to receive a first power supply signal corresponding to the first light intensity, and the first light emitting assembly is configured to generate the first radiated light having the first light intensity according to the first power supply signal;

a second input port electrically connected with the second light emitting assembly and configured to receive a second power supply signal corresponding to the second light intensity, and the second light emitting assembly is configured to generate the second radiated light having the second light intensity according to the second power supply signal; and a third input port electrically connected with the output port and the third light emitting assembly and configured to receive a color instruction signal corresponding to the preset color and a third power supply signal corresponding to the third light intensity, the output port is configured to output the color instruction signal as the output signal, and the third light emitting assembly is configured to generate the third radiated light having the preset color and the third light intensity according to the color instruction signal and the third power supply signal.

In some embodiments, the first power supply signal, the second power supply signal and the third power supply signal are all direct current signals.

In some embodiments, the illumination apparatus further comprises:

a second controller electrically connected with the third input port and configured to receive the color instruction signal and convert the color instruction signal into a color controlling signal; and a driver electrically connected between the second controller and the third light emitting assembly and configured to receive the color controlling signal, convert the color controlling signal into a color driving signal, and transmit the color driving signal to the third light emitting assembly.

In some embodiments, the second controller is further configured to relay the color instruction signal to the output port.

In some embodiments, the second controller is configured to periodically control, at a preset frequency, the driver to drive the third light emitting assembly.

In some embodiments, the lighting sensor is disposed adjacent the imaging apparatus.

In some embodiments, the first lighting parameter comprises an ambient light intensity and an ambient color temperature;

the second lighting parameter comprises an illumination light intensity and an illumination color temperature; and the preset parameter range comprises a preset light intensity range and a preset color temperature range.

In some embodiments, the lighting sensor comprises;

a color temperature sensor configured to acquire the ambient color temperature; and a light intensity sensor configured to acquire the ambient light intensity.

In some embodiments, the system further comprises:

a power supply apparatus electrically connected with the illumination apparatus and the first controller and configured to supply power to the illumination apparatus under the control of the first controller.

In some embodiments, the power supply apparatus comprises:

a power supply assembly configured to generate a direct current power supply signal; and a conversion assembly electrically connected with the power supply assembly and configured to convert the direct current power supply signal into a first power supply signal for supplying the first light emitting assembly, a second power supply signal for supplying the second light emitting assembly, and a third power supply signal for supplying the third light emitting assembly.

In some embodiments, the conversion assembly is further configured to convert the direct current power supply signal into a fourth power supply signal for supplying the first controller.

In some embodiments, the conversion assembly is further configured to convert the direct current power supply signal to a fifth power supply signal for supplying the processor.

In some embodiments, the conversion assembly comprises:

a first direct current converter configured to convert the direct current power supply signal into a first intermediate signal, wherein a level of the direct current power supply signal is higher than that of the first intermediate signal;

a first switch electrically connected with the first direct current converter and configured to control on and off of the first direct current converter;

a first voltage regulator electrically connected with the first controller and the first direct current converter and configured to regulate the first intermediate signal to the first power supply signal under the control of the first controller;

a second direct current converter configured to convert the direct current power supply signal into a second intermediate signal, wherein the level of the direct current power supply signal is higher than that of the second intermediate signal;

a second switch electrically connected with the second direct current converter and configured to control on and off of the second direct current converter;

a second voltage regulator electrically connected with the first controller and the second direct current converter and configured to regulate the second intermediate signal to the second power supply signal under the control of the first controller;

a third direct current converter configured to convert the direct current power supply signal into the third power supply signal, wherein the level of the direct current power supply signal is higher than that of the third power supply signal; and a third switch electrically connected with the third direct current converter and configured to control on and off of the third direct current converter.

In some embodiments, the conversion assembly further comprises a sampling circuit configured to sample the first power supply signal, the second power supply signal, and the third power supply signal to generate a sampled signal to be transmitted to the first controller.

In some embodiments, the first controller is further configured to control the conversion assembly to adjust at least one of the first power supply signal, the second power supply signal, and the third power supply signal according to the first lighting parameter and the sampled signal.

In some embodiments, the first controller is further configured to receive a control instruction signal from the processor and control the second lighting parameter according to the control instruction signal.

In some embodiments, the system further comprises:

a user interaction apparatus communicatively connected with the processor and configured to receive a user instruction and/or output at least a portion of feedback data generated by the system.

In some embodiments, the user interaction apparatus comprises a display apparatus.

In some embodiments, the system further comprises:

an object sensor configured to detect whether there is an object to be recognized;

wherein the first controller is further configured to control the illumination apparatus to turn off when there is no object to be recognized.

In some embodiments, the object sensor comprises a distance sensor disposed in the recognition environment.

According to a second aspect of the present disclosure, there is provided an object recognition method comprising:

acquiring a first lighting parameter of an ambient light in a recognition environment in which an object is located;

comparing the first lighting parameter with a preset parameter range;

when the first lighting parameter is outside the preset parameter range, adjusting a second lighting parameter of an illumination light until the first lighting parameter is within the preset parameter range;

acquiring imaging data of the object under the ambient light within the preset parameter range; and recognizing the object according to the imaging data.

In some embodiments, the first lighting parameter comprises an ambient light intensity and an ambient color temperature;

the second lighting parameter comprises an illumination light intensity and an illumination color temperature; and the preset parameter range comprises a preset light intensity range and a preset color temperature range.

In some embodiments, that when the first lighting parameter is outside the preset parameter range, adjusting the second lighting parameter of the illumination light until the first lighting parameter is within the preset parameter range comprises:

when the ambient color temperature is outside the preset color temperature range, adjusting at least one of a first power supply signal for driving a first light emitting assembly and a second power supply signal for driving a second light emitting assembly, until the ambient color temperature is within the preset color temperature range, wherein the first light emitting assembly is configured to generate a first radiated light having a first color temperature and the second light emitting assembly is configured to generate a second radiated light having a second color temperature that is lower than the first color temperature; and when the ambient light intensity is outside the preset light intensity range, proportionally adjusting the first power supply signal and the second power supply signal, until the ambient light intensity is within the preset light intensity range, and the ambient color temperature is kept within the present color temperature range.

In some embodiments, the method further comprises:

detecting whether there is an object to be recognized in the recognition environment;

when there is no object, controlling the illumination light to be turned off.

In some embodiments, the method further comprises:

determining a current object recognition state;

generating a color instruction signal corresponding to a preset color according to the object recognition state, wherein the preset color is configured to indicate the object recognition state; and generating a third radiated light having the preset color according to the color instruction signal.

Other features of the present disclosure and advantages thereof will become more apparent from the following detailed description of exemplary embodiments thereof, which proceeds with reference to the accompanying drawings.

BRIEF DESCRIPTION OF THE DRAWINGS

The accompanying drawings, which constitute a part of the specification, illustrate embodiments of the present disclosure and, together with the description, serve to explain the principles of the present disclosure.

The present disclosure will be better understood according the following detailed description with reference of the accompanying drawings, wherein.

Figure 1:
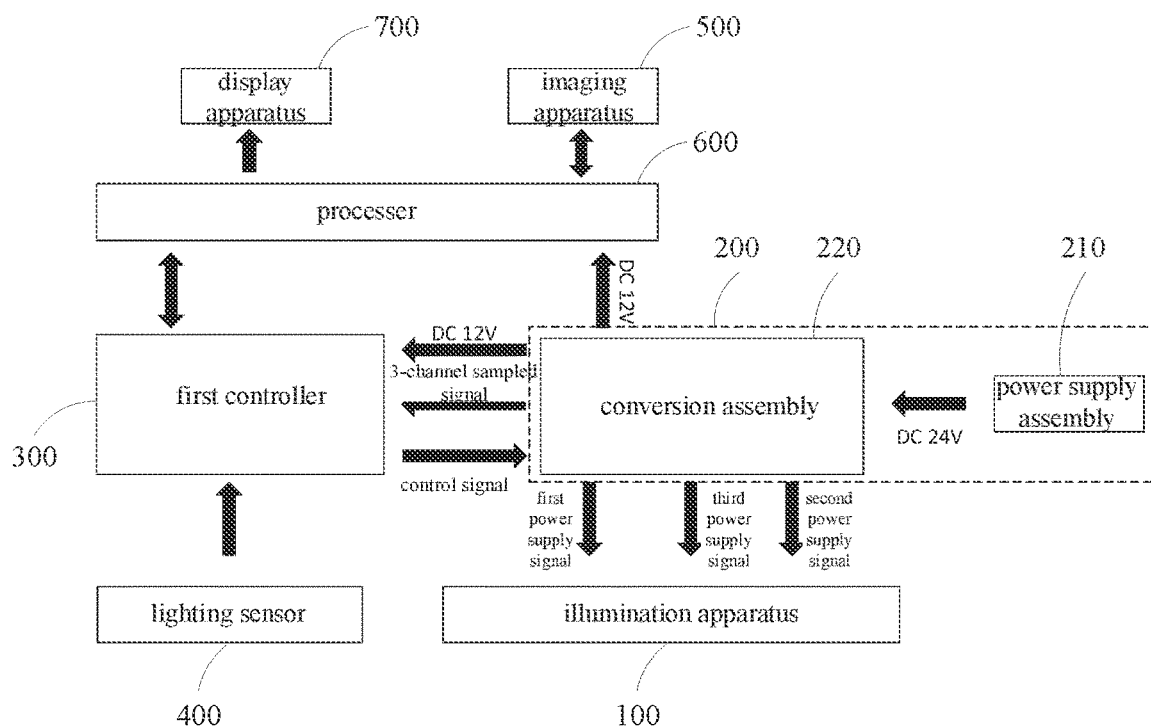
FIG. 1 shows a schematic block diagram of an object recognition system according to an exemplary embodiment of the present disclosure.

Note that, in the embodiments described below, in some cases the same portions or portions having similar functions are denoted by the same reference numerals in different drawings, and description of such portions is not repeated. In some cases, similar reference numerals and letters are used to refer to similar items, and thus once an item is defined in one figure, it need not be further discussed for following figures.

In order to facilitate understanding, the position, the size, the range, or the like of each structure illustrated in the drawings and the like are not accurately represented in some cases. Thus, the disclosure is not necessarily limited to the position, size, range, or the like as disclosed in the drawings and the like. Black arrows represent electric signals, and white dashed-line arrows represent optical signals.

DETAILED DESCRIPTION

Various exemplary embodiments of the present disclosure will be described in details with reference to the accompanying drawings in the following. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit this disclosure, its application, or uses. That is to say, the structure and method discussed herein are illustrated by way of example to explain different embodiments according to the present disclosure. It should be understood by those skilled in the art that, these examples, while indicating the implementations of the present disclosure, are given by way of illustration only, but not in an exhaustive way. In addition, the drawings are not necessarily drawn to scale, and some features may be enlarged to show details of some specific components.

Techniques, methods and apparatus as known by one of ordinary skill in the relevant art may not be discussed in detail, but are intended to be regarded as a part of the specification where appropriate.

In all of the examples as illustrated and discussed herein, any specific values should be interpreted to be illustrative only and non-limiting. Thus, other examples of the exemplary embodiments could have different values.

Figure 3:
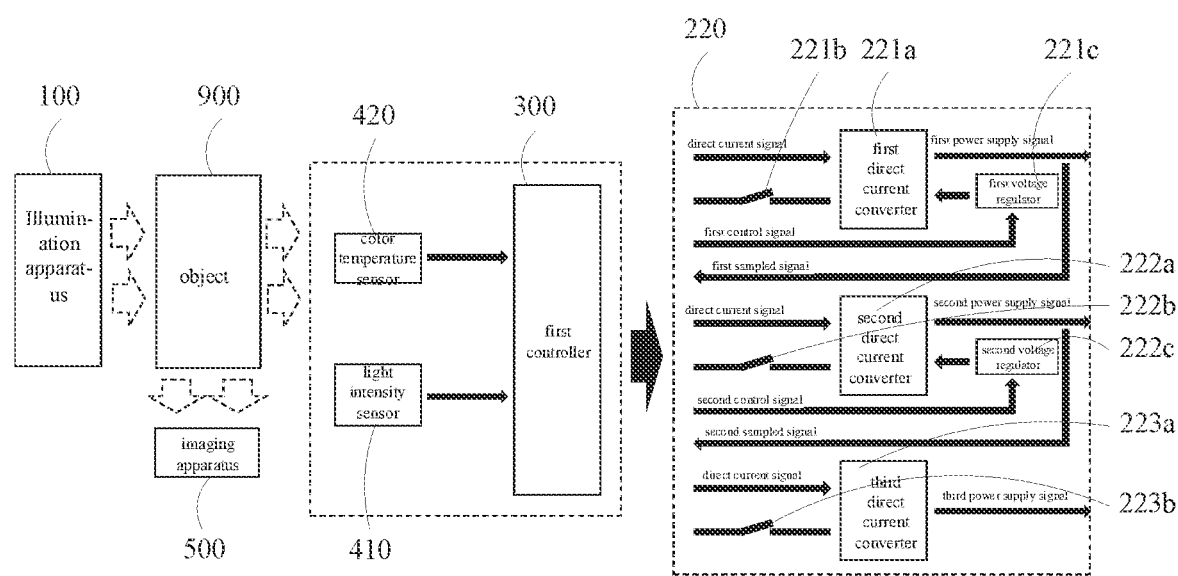
FIG. 3 shows a schematic block diagram of a portion of the object recognition system and an object according to an exemplary embodiment of the present disclosure.

In an exemplary embodiment of the present disclosure, an object recognition system is proposed. As shown in FIGS. 1 and 3, the system may comprise an illumination apparatus 100, a lighting sensor 400, an imaging apparatus 500, a first controller 300, and a processor 600. In the object recognition system, a first lighting parameter of an ambient light in a recognition environment in which an object 900 is located may be acquired by the lighting sensor 400, a second lighting parameter of an illumination light generated by the illumination apparatus 100 may be adjusted according to the first lighting parameter by the first controller 300 until the first lighting parameter of the ambient light is within a preset parameter range, and the object 900 is recognized by the processor 600 according to imaging data of the object 900 acquired by the imaging apparatus 500 under the ambient light within a preset parameter range, which solves the problem of difficulty in recognition under a poor lighting condition, and improves the effect of automatic recognition of the object.

Figure 2:
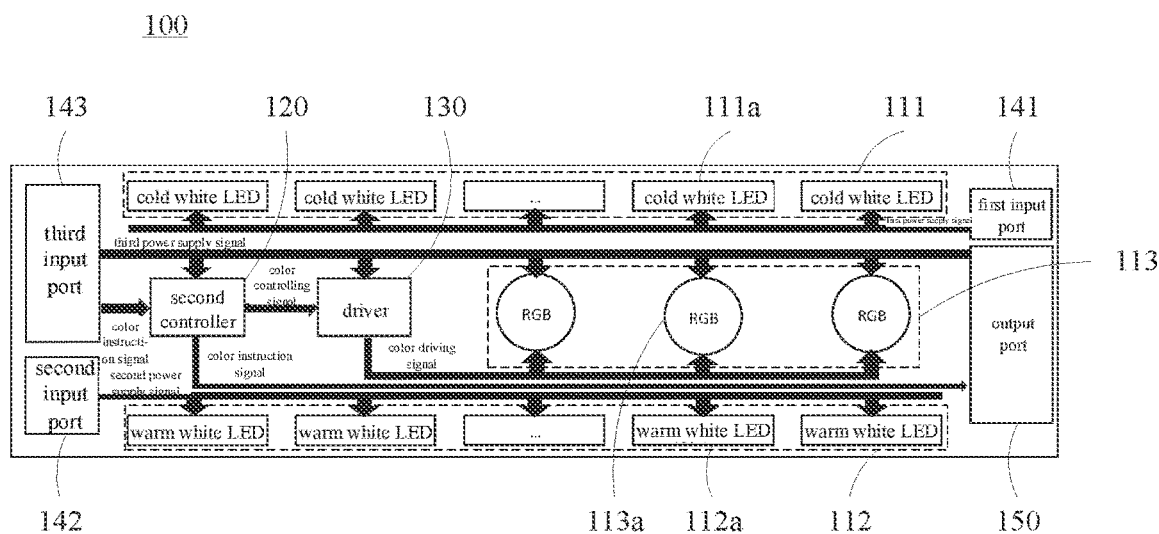
FIG. 2 shows a schematic block diagram of an illumination apparatus in the object recognition system according to an exemplary embodiment of the present disclosure.

As shown in FIG. 2, the illumination apparatus 100 may be configured to generate an illumination light for illuminating an object. Specifically, the illumination apparatus 100 may comprise a first light emitting assembly 111 and a second light emitting assembly 112. The first light emitting assembly 111 and the second light emitting assembly 112 may be configured for illumination, e.g. generating a white light for illumination.

In some embodiments, the first light emitting assembly 111 may be configured to generate a first radiated light having a first color temperature and a first light intensity, and the second light emitting assembly 112 may be configured to generate a second radiated light having a second color temperature and a second light intensity, wherein the second color temperature is lower than the first color temperature. The first color temperature and the second color temperature may be determined by properties (including light emitting principle, light emitting material, etc.) of the first light emitting assembly 111 and the second light emitting assembly 112, respectively. Further, the first light intensity and the second light intensity can be changed, and in particular, the first light intensity and the second light intensity can be adjusted by adjusting a first power supply signal applied to the first light emitting assembly 111 and a second power supply signal applied to the second light emitting assembly 112, respectively. By varying a relative proportion of the first radiated light with respect to the second radiated light, i.e., by varying a relative magnitude between the first light intensity and the second light intensity, adjustment of the color temperature may be achieved, to help achieve better object recognition. For example, when a lower color temperature is desired, a proportion of the first light intensity of the first radiated light in a total light intensity can be appropriately decreased or the first light emitting assembly 111 can be turned off, and similarly, when a higher color temperature is desired, the proportion of the first light intensity of the first radiated light in the total light intensity can be appropriately increased or the second light emitting assembly 112 can be turned off.

As shown in FIG. 2, the first light emitting assembly 111 may include a plurality of first light emitting diodes 111a (cold white LEDs shown in FIG. 2), and the first light emitting diode 111a may be configured to generate a first white light having a first color temperature. By providing a plurality of first light emitting diodes 111a, on the one hand, the first light intensity of the first radiated light generated by the first light emitting assembly 111 can be increased, and on the other hand, the position of each first light emitting diode 111a can be set to help realize a uniform distribution or other specific distributions of the first radiated light in space. In addition, the plurality of first light emitting diodes 111a may be connected in parallel, so that when a certain first light emitting diode 111a malfunctions, other first light emitting diodes 111a can still operate normally to ensure normal illumination as much as possible.

In some embodiments, the first light emitting diodes 111a may be disposed at an equal interval from each other, and uniformly distributed on the substrate to form a uniform illuminating condition. The interval between two adjacent first light emitting diodes 111a may be determined according to a required maximum first light intensity, and the larger the maximum first light intensity is, the smaller the interval between the two adjacent first light emitting diodes 111a may be.

Similarly, the second light emitting assembly 112 may include a plurality of second light emitting diodes 112a (warm white LEDs shown in FIG. 2), and the second light emitting diode 112a may be configured to generate a second white light having a second color temperature. By providing a plurality of second light emitting diodes 112a, on the one hand, the second light intensity of the second radiated light generated by the second light emitting assembly 112 can be increased, and on the other hand, the position of each second light emitting diode 112a can be set to help realize a uniform distribution or other specific distributions of the second radiated light in space. In addition, the plurality of second light emitting diodes 112a may be connected in parallel, so that when a certain second light emitting diode 112a malfunctions, other second light emitting diodes 112a can still operate normally to ensure normal illumination as much as possible.

In some embodiments, the second light emitting diodes 112a may be disposed at an equal interval from each other, and uniformly distributed on the substrate to form a uniform illuminating condition. In addition, the second light emitting diodes 112a may also be distributed in a staggered manner with respect to the first light emitting diodes 111a, so as to make the color temperature of the finally generated illumination light be as uniform as possible. The interval between two adjacent second light emitting diodes 112a may be determined according to a required maximum second light intensity, and the larger the maximum second light intensity is, the smaller the interval between the two adjacent second light emitting diodes 112a may be.

As shown in FIG. 2, the illumination apparatus 100 may further include a third light emitting assembly 113 configured to generate a third radiated light having a preset color and a third light intensity, and the preset color and the third light intensity may be adjustable. In some embodiments, the third light emitting assembly 113 may be configured to indicate current status information, and specifically, the current status information may reflect the current status of the illumination apparatus 100 itself, or may reflect the current status of another apparatus connected with the illumination apparatus 10 or the current status of the object recognition system comprising the illumination apparatus 100, etc., so that a user may learn the current situation or proceed with other operations according to the indication of the third light emitting assembly 113. In some embodiments, different preset colors can be utilized to correspond to different current status information; in some other embodiments, different current status information can be indicated by forming flashing and breathing light emitting effects by adjusting the third light intensity; in still other embodiments, various light emitting effects may be formed by the combination of the preset color and a regular change in the third light intensity, to indicate the corresponding current status information.

As shown in FIG. 2, the third light emitting assembly 113 may include a plurality of third light emitting devices 113a, wherein the third light emitting device 113a is configured to generate a chromatic light. By providing a plurality of third light emitting devices 113a, on the one hand, the third light intensity of the third radiated light generated by the third light emitting assembly 113 can be increased, and on the other hand, the position of each third light emitting device 113a can be set to help realize a uniform distribution or other specific distributions of the third radiated light in space, including participating in forming a specific pattern for indicating the current status information, etc. In addition, the plurality of third light emitting devices 113a may be connected in parallel, so that when a certain third light emitting device 113a malfunctions, other third light emitting devices 113a can still normally operate to ensure normal illumination as much as possible.

In some embodiments, the third light emitting devices 113a may be disposed at an equal interval from each other and uniformly distributed on the substrate to generate a uniform third radiated light. In addition, the third light emitting device 113a may be disposed in a staggered manner with respect to the first light emitting diode 111a and the second light emitting diode 112a, that is, the first light emitting diode 111a or the second light emitting diode 112a is adjacent to the third light emitting device 113a, so that the first light emitting diodes 111a, the second light emitting diodes 112a, and the third light emitting devices 113a may be substantially distributed on the entire substrate, such that both the white light for illumination and the chromatic light for indicating the current status information may be substantially uniform. In some embodiments, the first light emitting diodes 111a have a greater distribution density than that of the third light emitting devices 113a, and similarly, the second light emitting diodes 112a also have a greater distribution density than that of the third light emitting devices 113a, so as to provide sufficient white light illumination to meet the light intensity requirement during shooting of the object, thereby helping improve the recognition effect; while the third light emitting assembly 113 is used to indicate the current status information, thus the third light emitting devices 113a therein may have a smaller distribution density, that is, an interval between two adjacent third light emitting devices 113a may be larger, to avoid excessive power consumption while implementing the indicating function.

To produce a chromatic light, lights of three colors of red, green and blue can be produced and combined in different proportions. For a single third light emitting device 113a, it may include at least one third light emitting diode, at least one fourth light emitting diode, and at least one fifth light emitting diode, wherein the third light emitting diode may be configured to generate a red light, the fourth light emitting diode may be configured to generate a green light, and the fifth light emitting diode may be configured to generate a blue light. By controlling proportions of respective chromatic lights generated by the respective light emitting diodes in the third light emitting device 113a, a chromatic light having a plurality of colors can be generated. Of course, in other embodiments, the third light emitting device 113a may have other configurations to generate the chromatic light.

In order to adjust the radiated light generated by the individual light emitting assemblies in the illumination apparatus 100, corresponding signals may be provided to the individual light emitting assemblies respectively through ports, conductive cables, etc. The illumination apparatus 100 may include one or more input ports each configured to receive a respective input signal. As shown in FIG. 2, the one or more input ports may include a first input port 141, a second input port 142, and a third input port 143.

The first input port 141 may be electrically connected with the first light emitting assembly 111 and configured to receive a first power supply signal corresponding to the first light intensity, wherein the first power supply signal may come from a power supply apparatus 200 as will be described later. The first light emitting assembly 111 may be configured to generate the first radiated light having the first light intensity according to the first power supply signal. In some embodiments, the first power supply signal is a first direct current signal, which may for example have a maximum level of 5V, and the level of the first direct current signal may be varied within a range to adjust the first light intensity of the first radiated light.

Similarly, the second input port 142 can be electrically connected with the second light emitting assembly 112 and configured to receive a second power supply signal corresponding to the second light intensity, wherein the second power supply signal may come from the power supply apparatus 200. The second light emitting assembly 112 can be configured to generate the second radiated light having the second light intensity according to the second power supply signal. In some embodiments, the second power supply signal is a second direct current signal, which may for example have a maximum level of 5V, and the level of the second direct current signal may be varied within a range to adjust the second light intensity of the second radiated light.

The third input port 143 may be electrically connected with the third light emitting assembly 113 and configured to receive a third power supply signal corresponding to the third light intensity, wherein the third power supply signal may come from the power supply apparatus 200. The third light emitting assembly 113 can be configured to generate the third radiated light having the third light intensity according to the third power supply signal. In some embodiments the third power supply signal is a third direct current signal, which may for example have a maximum level of 5V, and the level of the third direct current signal may be varied within a range to adjust the third light intensity of the third radiated light.

In addition, the third input port 143 may also be configured to receive a color instruction signal corresponding to the preset color, wherein the color instruction signal may come from the first controller 300 described below, and the first controller 300 may obtain the color instruction signal from the processor 600, or generate the color instruction signal according to a control instruction signal or the like from the processor 600. The color instruction signal may also be generated according to the current status of the illumination apparatus 100 itself, or the current status of another apparatus connected to the illumination apparatus 100 or the current status of the object recognition system including the illumination apparatus 100, etc. The third light emitting assembly 113 may be configured to generate the third radiated light having the preset color according to the color instruction signal.

The color instruction signal may be difficult to directly drive the third light emitting assembly 113 to generate the third radiated light. In some embodiments, as shown in FIG. 2, the illumination apparatus 100 may further include a second controller 120 and a driver 130. The second controller 120 may be configured to receive the color instruction signal and convert the color instruction signal into a color controlling signal, that is, the second controller 120 may parse the color instruction signal to form a color controlling signal encoded according to a preset encoding rule, for example. In some embodiments, the second controller 120 may be a Micro Control Unit (MCU). Further, the driver 130 may be electrically connected between the second controller 120 and the third light emitting assembly 113, and configured to receive the color controlling signal, convert the color controlling signal into a color driving signal, and transmit the color driving signal to the third light emitting assembly 113. The color driving signal may be designed according to a type or model of the third light emitting assembly 113 actually used, and the third light emitting assembly 113 may be directly driven by the color driving signal to generate the third radiated light having the preset color. For example, the color driving signal may include a pulse signal, a square wave signal, or the like. In some embodiments, the color driving signal may include a pulse width modulated signal, a change in the duty cycle of which can control a change in the color of the third radiated light. In some other embodiments, a high level and a low level may be used to represent 0 and 1 of a bit, respectively, the color driving signal may be a square wave signal, and a specific waveform of the square wave signal may be used to represent a plurality of bits corresponding to the preset color.

In practice, the color instruction signal, the color controlling signal, the color driving signal, etc. may suffer from other interferences in the environment, resulting in an undesired change of their duty cycle and thus in a color error of the generated third radiated light. In order to solve the above problem, the second controller 120 is further configured to periodically control, at a preset frequency, the driver 130 to drive the third light emitting assembly 113. Then, in each driving, the color driving signal received by the third light emitting assembly 113 is refreshed to avoid that the previous interferences continuously affect the color of the third radiated light. In some embodiments, the second controller 120 may periodically receive the color instruction signal and continue to control the driver 130 to drive the third light emitting assembly 113. In some other embodiments, the second controller 120 may periodically generate the color controlling signal according to the color instruction signal and continue to control the driver 130 to drive the third light emitting assembly 113. In still other embodiments, the second controller 120 may control the driver 130 to periodically generate the color driving signal according to the color controlling signal, to drive the third light emitting assembly 113. The preset frequency may be set to be greater than a frequency corresponding to a time period for the persistence of vision so that a possible color error of the third radiated light can be ignored.

As shown in FIG. 2, the illumination apparatus 100 may further include an output port 150 electrically connected with at least one of the one or more input ports, and configured to output an output signal, wherein the output signal may include at least a portion of an input signal received by the input port electrically connected with the output port 150. By providing the output port 150, at least a portion of the input signal received by the illumination apparatus 100 can be relayed out for providing to other apparatuses, devices, or systems, etc., e.g., to at least one input port of another illumination apparatus, to facilitate signal transmission and configuration of the object recognition system.

In some embodiments, the third input port 143 may be electrically connected with the output port 150, and the output port 150 may be configured to output the color instruction signal received by the third input port 143 as an output signal. When the output port 150 is connected to a third input port of another illumination apparatus, the color instruction signal can be directly transmitted through the illumination apparatuses, so that the plurality of illumination apparatuses generate the third radiated light of the same color. In addition, when it is needed to assemble a plurality of illumination apparatuses in the object recognition system, corresponding electrical connections are needed according to the input port and the output port of the illumination apparatus only, without the need of considering circuit installation errors possibly caused by changes of left and right directions of the illumination apparatus and the like, thereby facilitating to simplify the process and to reduce the assembly cost.

Since the first power supply signal, the second power supply signal, and the third power supply signal all may be direct current signals and may be conveniently provided to the corresponding light emitting assemblies through the power supply apparatus 200, the output port 150 may not relay the first power supply signal, the second power supply signal, and the third power supply signal, but the power supply apparatus 200 may directly supply the corresponding first power supply signal, the second power supply signal, and the third power supply signal to the plurality of illumination apparatuses 100. Of course, in other embodiments, if related circuits in the illumination apparatus 100 and the power supply apparatus 200 are different, at least one of the first power supply signal, the second power supply signal, and the third power supply signal may be relayed by the output port 150 as needed.

As shown in FIG. 2, in some embodiments, the second controller 120 is further configured to relay the color instruction signal to the output port 150, that is, the color instruction signal received by the third input port 143 will flow to the output port 150 through the second controller 120. In some embodiments, the second controller 120 relays the color instruction signal directly without any processing, and in some other embodiments, the second controller 120 may also perform some processing on the color instruction signal and provide it to the output port 150 for output.

As shown in FIGS. 1 and 3, the lighting sensor 400 may be configured to acquire a first lighting parameter of the ambient light in the recognition environment in which the object is located, so that the first controller 300 may adjust the illumination apparatus 100 according to the first lighting parameter, thereby achieving a better object recognition effect.

In general, color temperature and light intensity have a significant influence on the imaging effect, thus the object recognition system can focus on the adjustment of the color temperature and light intensity of the illumination light. In some embodiments, the first lighting parameter may include an ambient light intensity and an ambient color temperature, and accordingly, as shown in FIG. 3, the lighting sensor 400 may include a light intensity sensor 410 and a color temperature sensor 420, wherein the light intensity sensor 410 may be configured to obtain the ambient light intensity, and the color temperature sensor 420 may be configured to obtain the ambient color temperature, and specifically the color temperature may be obtained by analyzing components of red, green, and blue lights in the received ambient light. In some embodiments, as shown in FIG. 3, the light intensity sensor 410, the color temperature sensor 420 and the first controller 300 may be integrated on the same control circuit board, which is typically a printed circuit board.

In the object recognition system, the first lighting parameter in the recognition environment in which the object is located may not be uniformly distributed, so in order to better reflect the first lighting parameter to help adjust the illumination apparatus 100, the lighting sensor 400 may be disposed adjacent to the imaging apparatus 500. In this way, the first lighting parameter at the position where the imaging apparatus 500 is located can be obtained by the lighting sensor 400 as accurately as possible to improve the adjustment effect of the illumination apparatus 100, thereby improving the recognition effect of the object.

As shown in FIGS. 1 and 3, the imaging apparatus 500 may be configured to acquire imaging data of the object. The imaging apparatus 500 may include, for example, a camera, a video camera, and the like. The installation position of the imaging apparatus 500 may be configured to conveniently acquire a feature of the object for recognition to improve the recognition effect. In some embodiments, multiple imaging apparatuses 500 may also be provided to acquire imaging data of the object from different perspectives, helping to recognize the object better.

As shown in FIG. 1, the first controller 300 may be communicatively connected with the illumination apparatus 100 and the lighting sensor 400, and configured to control a second lighting parameter of the illumination light generated by the illumination apparatus 100 according to the first lighting parameter, until the first lighting parameter of the ambient light is within a preset parameter range. When the first lighting parameter comprises the ambient light intensity and the ambient color temperature, correspondingly, the second lighting parameter may comprise an illumination light intensity and an illumination color temperature, and the preset parameter range may comprise a preset light intensity range and a preset color temperature range. Specifically, when the illumination light intensity is adjusted so that the ambient light intensity is within the preset light intensity range, and the illumination color temperature is adjusted so that the ambient color temperature is within the preset color temperature range, the imaging apparatus 500 can acquire the imaging data of the object with a good effect to help improve the recognition effect.

In some embodiments, the first controller 300 may also be communicatively connected with the processor 600 to receive a control instruction signal from the processor 600 and to control the second lighting parameter of the illumination light according to the control instruction signal.

Specifically, the first controller 300 may control the second lighting parameter by controlling power supply of the power supply apparatus 200 of the object recognition system to the illumination apparatus 100. In some embodiments, the first controller 300 may be electrically connected with the power supply apparatus 200, the power supply apparatus 200 may be electrically connected with the illumination apparatus 100, and the power supply apparatus 200 is configured to supply power to the illumination apparatus 100 under the control of the first controller 300.

As shown in FIGS. 1 and 3, the power supply apparatus 200 may include a power supply assembly 210 and a conversion assembly 220. The power supply assembly 210 may be configured to generate a direct current power supply signal having a preset level, and the conversion assembly 220 may be electrically connected with the power supply assembly 210 and configured to convert the direct current power supply signal into a first power supply signal for supplying the first light emitting assembly 111, a second power supply signal for supplying the second light emitting assembly 112, and a third power supply signal for supplying the third light emitting assembly 113. For example, in a specific example shown in FIG. 1, the level of the direct current power supply signal may be 24V, the first power supply signal, the second power supply signal and the third power supply signal are generally less than 24V, for example, are adjustable in a range of 0-5V.

As shown in FIG. 3, the conversion assembly 220 may include a first direct current converter 221a, a first switch 221b, and a first voltage regulator 221c. The first direct current converter 221a may be configured to convert the direct current power supply signal into a first intermediate signal, and the level of the direct current power supply signal is higher than that of the first intermediate signal, wherein the level of the first intermediate signal may be greater than or equal to a possible maximum level of the first power supply signal provided to the first light emitting assembly 111. The first switch 221b may be electrically connected with the first direct current converter 221a and configured to control on and off of the first direct current converter 221a to help achieve rapid on/off of the first power supply signal.

The first voltage regulator 221c may include various circuits having a voltage regulation function. For example, the first voltage regulator 221c may include a first variable resistor, which may be electrically connected with the first controller 300 and the first direct current converter 221a and divide the first intermediate signal. By regulating a magnitude of the first variable resistor, a magnitude of the output first power supply signal can be regulated, thereby regulating the first light intensity of the first radiated light. Alternatively, the first voltage regulator 221c may include a first voltage-varying chip, which may be electrically connected with the first controller 300 and the first direct current converter 221a and regulate the output first power supply signal under a first control signal of the first controller 300.

Similarly, as shown in FIG. 3, the conversion assembly 220 may further include a second direct current converter 222a, a second switch 222b, and a second voltage regulator 222c. The second direct current converter 222a may be configured to convert the direct current power supply signal into a second intermediate signal, and a level of the direct current power supply signal is higher than that of the second intermediate signal, wherein the level of the second intermediate signal may be greater than or equal to a possible maximum level of the second power supply signal provided to the second light emitting assembly 112. The second switch 222b may be electrically connected with the second direct current converter 222a and configured to control on and off of the second direct current converter 222a to help achieve rapid on/off of the second power supply signal.

The second voltage regulator 222c may include various circuits having the voltage regulation function. For example, the second voltage regulator 222c may include a second variable resistor, which may be electrically connected with the first controller 300 and the second direct current converter 222a and divide the second intermediate signal. By regulating a magnitude of the second variable resistor, a magnitude of the output second power supply signal can be regulated, thereby regulating the second light intensity of the second radiation light. Alternatively, the second voltage regulator 222c may include a second voltage-varying chip, which may be electrically connected with the first controller 300 and the second direct current converter 222a and regulate the output second power supply signal under a second control signal of the first controller 300.

As shown in FIG. 3, the conversion assembly 220 may further include a third direct current converter 223a and a third switch 223b, wherein the third direct current converter 223a may be configured to convert the direct current power supply signal into a third power supply signal, to drive the third light emitting assembly 113 to generate a corresponding third radiated light. The third switch 223b may be electrically connected with the third direct current converter 223a and configured to control on and off of the third direct current converter 223a to help achieve rapid on/off of the third power supply signal. Since the third light emitting assembly 113 may be configured to indicate the current status information, and the third light intensity of the third radiated light generated thereby has little influence on the automatic recognition of the object, a corresponding third voltage regulator or the like may not be provided for the third direct current converter 223a, so as to simplify the structure of the conversion assembly 220. In some embodiments, the conversion assembly 220 may be disposed on a conversion circuit board, which is typically a printed circuit board.

Further, the first controller 300 may be electrically connected with the illumination apparatus 100 and the power supply apparatus 200, and configured to adjust at least one of the first light intensity, the second light intensity, the third light intensity, and the preset color. As shown in FIGS. 1 and 3, the first controller 300 may generate a control signal and transmit the control signal to the conversion assembly 220 (e.g., a first control signal transmitted to the first voltage regulator 221c and a second control signal transmitted to the second voltage regulator 222c may be included), to control on/off and the level, etc. of each power supply signal (e.g., the first power supply signal for driving the first light emitting assembly 111 and the second power supply signal for driving the second light emitting assembly 112 may be included) output by the conversion assembly 200. In addition, the third light intensity may be changed with the third power supply signal, and the preset color may be changed with the color driving signal generated according to the color instruction signal.

In some embodiments, the conversion assembly 220 may convert the direct current power supply signal into a fourth power supply signal for supplying the first controller 300, in addition to the first power supply signal, the second power supply signal and the third power supply signal for supplying power to the illumination apparatus 100, so as to provide power required for supporting the operation of the first controller 300. In a specific example shown in FIG. 1, the control power supply signal may be a direct current signal of 12V.

In some embodiments, the conversion assembly 220 may also convert the direct current power supply signal into a fifth power supply signal for supplying the processor 600 to provide power required for supporting the operation of the processor 600. In a specific example shown in FIG. 1, the fifth power supply signal may be a direct current signal of 12V.

In order to adjust the second lighting parameter of the illumination light generated by the illumination apparatus 100 more effectively, in some embodiments, the first controller 300 may also participate in monitoring the power supply state of the power supply apparatus 200. Specifically, the conversion assembly 220 may include a sampling circuit configured to sample the first power supply signal, the second power supply signal, and the third power supply signal to generate a sampled signal (e.g., a 3-channel sampling signals shown in FIG. 1 may be included, wherein one channel corresponds to a power supply signal supplied to one light emitting assembly, or the first sampled signal and the second sampled signal shown in FIG. 3 may be included), and to transmit the sampled signal to the first controller 300. In some embodiments, the sampling circuit may include an analog-to-digital conversion circuit or the like, wherein the analog-to-digital conversion circuit may convert the first power supply signal, the second power supply signal, and the third power supply signal in an analog form to a digital form to be subsequently analyzed and processed by the first controller 300.

The first controller 300 may be configured to control the conversion assembly 220 to control at least one of the first power supply signal, the second power supply signal, and the third power supply signal according to the sampled signal. For example, when the first controller 300 determines that the currently output first power supply signal, second power supply signal or third power supply signal does not meet the requirement corresponding to the control signal according to the fed-back sampled signal, the conversion assembly 220 may be controlled to increase or decrease the first power supply signal, the second power supply signal or the third power supply signal accordingly. In addition, when the first controller 300 determines that the adjustment of the first power supply signal, the second power supply signal, or the third power supply signal has already exceeded or is about to exceed a preset adjustment range according to the sampled signal, it may also generate a control signal to suspend the adjustment of the first power supply signal, the second power supply signal, or the third power supply signal, or quickly cut off the first power supply signal, the second power supply signal, or the third power supply signal directly by the first switch 221b, the second switch 222b, and the third switch 223b to protect the illumination apparatus 100 or the object recognition system.

As shown in FIG. 1, the processor 600 may be communicatively connected with the imaging apparatus 500 and the first controller 300 and configured to recognize the object according to the imaging data of the object under the ambient light within the preset parameter range.

The processor 600 may operate based on an operating system such as Android, Windows, and the like. In some embodiments, the imaging apparatus 500 may periodically acquire imaging data of the object, and the processor 600 may recognize the object according to the imaging data therein obtained under the ambient light within the preset parameter range. In some other embodiments, the processor 600 may judge the first lighting parameter of the ambient light, and only when the first lighting parameter is within the preset parameter range, it controls the imaging apparatus 500 to acquire the imaging data of the object and recognizes the object according to the imaging data.

In some embodiments, to facilitate the exchange of information between the user and the object recognition system, the object recognition system may further include a user interaction apparatus that may be communicatively connected with the processor 600 and configured to receive a user instruction and/or output at least a portion of the feedback data generated by the system. Specifically, as shown in FIG. 1, the user interaction apparatus may include a display apparatus 700, such as a display screen, a touch screen, or the like. In some embodiments, the user interaction apparatus may also include a keyboard, a mouse, or the like.

In order to determine whether there is an object to be recognized currently, the object recognition system may further include an object sensor (not shown in the figures), which may include, for example, a distance sensor or the like disposed in the recognition environment, and be configured to detect whether there is an object to be recognized. In some embodiments, the first controller 300 may be further configured to control the illumination apparatus 100 to be turned off when there is no object to be recognized, to save energy consumption.

Figure 4:
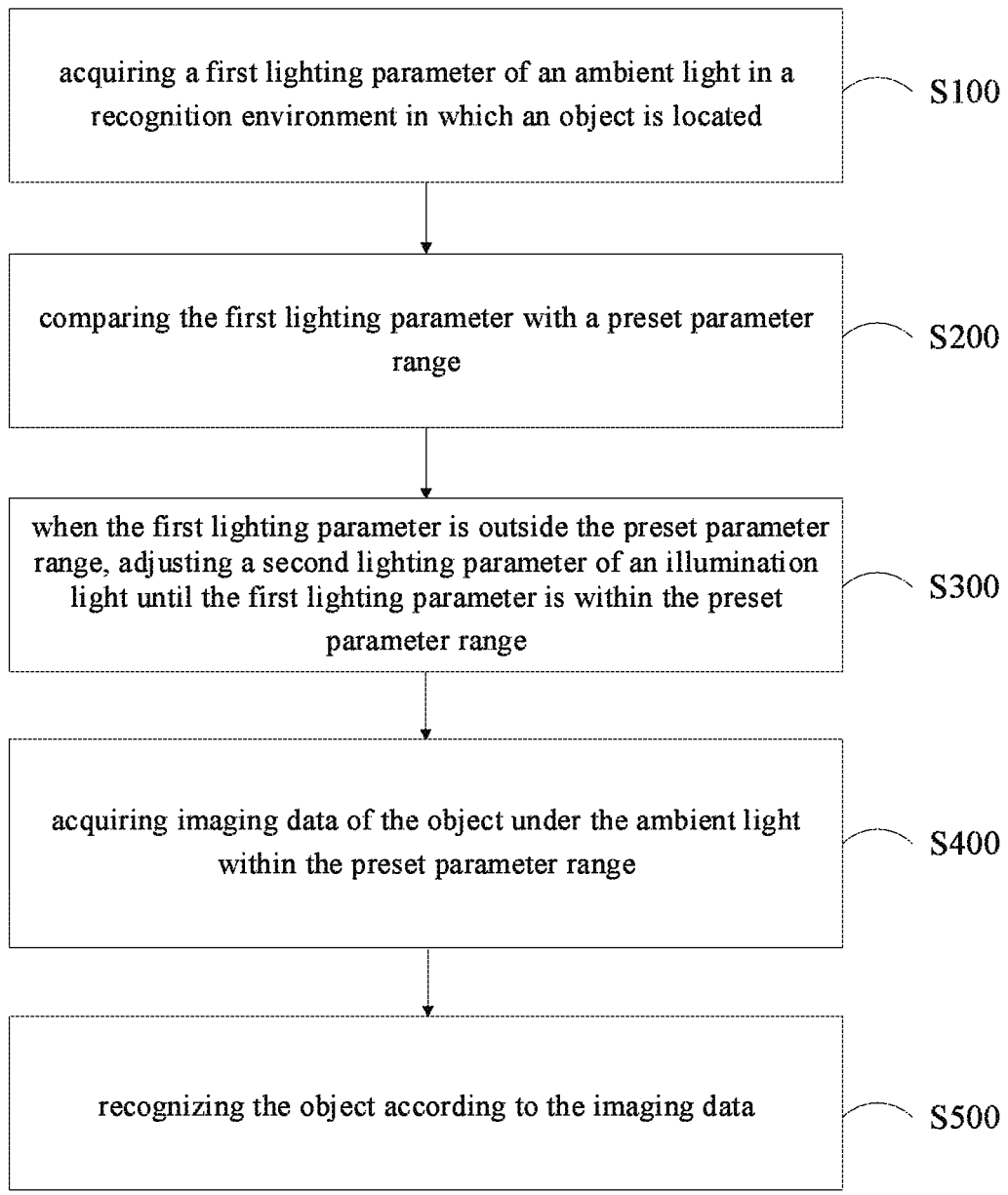
FIG. 4 shows a flowchart diagram of an object recognition method according to an exemplary embodiment of the present disclosure.

In an exemplary embodiment of the present disclosure, an object recognition method is further provided, in which the second lighting parameter of the illumination light may be adjusted according to the first lighting parameter of the ambient light until the first lighting parameter of the ambient light is within the preset parameter range, and the object is recognized according to the acquired imaging data of the object under the ambient light within the preset parameter range, which solves a problem of difficulty in recognition under a poor illuminating condition, and improves an effect of automatic recognition of the object. As shown in FIG. 4, the method may include:

step S100 of acquiring the first lighting parameter of the ambient light in the recognition environment in which the object is located.

Since the light intensity and color temperature generally have a greater influence on the imaging of the object, in some embodiments, the first lighting parameter may specifically include the ambient light intensity and the ambient color temperature, and is obtained by the lighting sensor 400 described above.

As shown in FIG. 4, the method may further include:

step S200 of comparing the first lighting parameter with the preset parameter range.

When the first lighting parameter includes the ambient light intensity and the ambient color temperature, the preset parameter range may correspondingly include the preset light intensity range and the preset color temperature range. By comparing the first lighting parameter with the preset parameter range, it can be determined whether the ambient light in the current recognition environment is suitable for forming imaging data of the object with a good effect.

As shown in FIG. 4, the object recognition method may further include:

step S300 of, when the first lighting parameter is outside the preset parameter range, adjusting the second lighting parameter of the illumination light until the first lighting parameter is within the preset parameter range.

The second lighting parameter may be adjusted by the first controller 300 described above by controlling the power supply signals output to the illumination apparatus 100 by the power supply apparatus 200, until the first lighting parameter is within the preset parameter range, so as to help form imaging data with a good effect, and further to help improve the recognition effect of the object. When the first lighting parameter includes the ambient light intensity and the ambient color temperature, the second lighting parameter correspondingly may include the illumination light intensity and the illumination color temperature.

In some embodiments, as shown in FIGS. 1 and 3, when the first lighting parameter is outside the preset parameter range, adjusting the second lighting parameter of the illumination light until the first lighting parameter is within the preset parameter range may specifically include:

when the ambient color temperature is outside the preset color temperature range, adjusting at least one of the first power supply signal for driving the first light emitting assembly 111 and the second power supply signal for driving the second light emitting assembly 112 until the ambient color temperature is within the preset color temperature range, wherein the first light emitting assembly 111 is configured to generate the first radiated light having the first color temperature, the second light emitting assembly 112 is configured to generate the second radiated light having the second color temperature, and the second color temperature is lower than the first color temperature; and when the ambient light intensity is outside the preset light intensity range, proportionally adjusting the first power supply signal and the second power supply signal until the ambient light intensity is within the preset light intensity range, and the ambient color temperature is kept within the preset color temperature range.

The specific structure and configuration of the first light emitting assembly 111 and the second light emitting assembly 112 may be as described in the exemplary embodiments described above with respect to the object recognition system, and a description thereof will not be repeated.

As shown in FIG. 4, the object recognition method may further include:

step S400 of acquiring imaging data of the object under the ambient light within the preset parameter range.

The imaging data of the object may be acquired by the imaging apparatus 500 described above. In some embodiments, the imaging apparatus 500 may periodically acquire the imaging data of the object, and in a later step, the imaging data obtained under the ambient light within the preset parameter range may be further processed to recognize the object. In some other embodiments, the imaging apparatus 500 may acquire the imaging data of the object only when the first lighting parameter of the ambient light is within the preset parameter range according to an instruction from the processor 600 or the like, so as to reduce the data amount of the generated imaging data and to facilitate processing.

As shown in FIG. 4, the object recognition method may further include:

step S500 of recognizing the object according to the imaging data.

The recognition of the object may be accomplished by the processor 600 described above executing a corresponding automatic recognition program. The processor 600 may operate based on an operating system such as Android, Windows, and the like. The automatic recognition program may be a program based on a machine learning method or the like. In some embodiments, the automatic recognition program may further include a related process for filtering the imaging data, to filter out the imaging data obtained under the ambient light within the preset parameter range, thereby helping improve the recognition effect.

In some embodiments, the object recognition method may further include:

detecting whether there is an object to be recognized in the recognition environment; and when no object is present, controlling the illumination light to be turned off.

Turning off the illumination light when there is no object to be recognized can help save energy consumption drastically. Whether there is an object to be recognized in the recognition environment may be determined by an object sensor such as a distance sensor as described above, and a description thereof will not be repeated.

In some embodiments, the object recognition method may further include:

determining a current object recognition state;

generating the color instruction signal corresponding to the preset color according to the object recognition state, wherein the preset color is configured to indicate the object recognition state; and generating the third radiated light having the preset color according to the color instruction signal.

The object recognition state may be used to indicate whether the object recognition system is already in a state of completing recognition preparation currently, whether the object recognition system is in a recognition failure state, or a specific object recognition mode (e.g., a category recognition mode for recognizing a category of an object and a size recognition mode for recognizing a size of an object), or the like. The first controller 300 as described above may generate the color instruction signal corresponding to the object recognition state to control the generation of the third radiated light of the preset color, so as to indicate the object recognition state. Of course, in some embodiments, the illumination apparatus 100 may also be caused to generate a radiated light having a particular effect in conjunction with the control of at least one of the first, second, and third power supply signals, to indicate a respective state.

The terms "front," "back," "top," "bottom," "over," "under" and the like, as used herein, if any, are used for descriptive purposes and not necessarily for describing permanent relative positions. It should be understood that such terms are interchangeable under appropriate circumstances such that the embodiments of the disclosure described herein are, for example, capable of operation in other orientations than those illustrated or otherwise described herein.

The term "exemplary", as used herein, means "serving as an example, instance, or illustration", rather than as a "model" that would be exactly duplicated. Any implementation described herein as exemplary is not necessarily to be construed as preferred or advantageous over other implementations. Furthermore, there is no intention to be bound by any expressed or implied theory presented in the preceding technical field, background, summary or detailed description.

The term "substantially", as used herein, is intended to encompass any slight variations due to design or manufacturing imperfections, device or component tolerances, environmental effects and/or other factors. The term "substantially" also allows for variation from a perfect or ideal case due to parasitic effects, noise, and other practical considerations that may be present in an actual implementation.

In addition, the foregoing description may refer to elements or nodes or features being "connected" or "coupled" together. As used herein, unless expressly stated otherwise, "connected" means that one element/node/feature is electrically, mechanically, logically or otherwise joined to (or communicates with) another element/node/feature. Likewise, unless expressly stated otherwise. "coupled" means that one element/node/feature may be mechanically, electrically, logically or otherwise joined to another element/node/feature in either a direct or indirect manner to permit interaction even though the two features may not be directly connected. That is, "coupled" is intended to encompass both direct and indirect joining of elements or other features, including connection with one or more intervening elements.

In addition, certain terminology, such as the terms "first", "second" and the like, may also be used herein for the purpose of reference only, and thus are not intended to be limiting. For example, the terms "first", "second" and other such numerical terms referring to structures or elements do not imply a sequence or order unless clearly indicated by the context.

Further, it should be noted that, the terms "comprise", "include", "have" and any other variants, as used herein, specify the presence of stated features, integers, steps, operations, elements, and/or components, but do not preclude the presence or addition of one or more other features, integers, steps, operations, elements, components, and/or groups thereof.

In this disclosure, the term "provide" is intended in a broad sense to encompass all ways of obtaining an object, thus the expression "providing an object" includes but is not limited to "purchasing", "preparing/manufacturing", "disposing/arranging", "installing/assembling", and/or "ordering" the object, or the like.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. However, other modifications, variations and alternatives are also possible. The description and drawings are, accordingly, to be regarded in an illustrative rather than in a restrictive sense.

Although some specific embodiments of the present disclosure have been described in detail with examples, it should be understood by a person skilled in the art that the above examples are only intended to be illustrative but not to limit the scope of the present disclosure. The embodiments disclosed herein can be combined arbitrarily with each other, without departing from the scope and spirit of the present disclosure. It should be understood by a person skilled in the art that the above embodiments can be modified without departing from the scope and spirit of the present disclosure. The scope of the present disclosure is defined by the attached claims.

What is claimed is:

1. An object recognition system, comprising:
    an illumination apparatus configured to generate an illumination light for illuminating an object;
    a lighting sensor configured to acquire a first lighting parameter of an ambient light in a recognition environment in which the object is located, wherein the first lighting parameter comprises an ambient light intensity and an ambient color temperature;
    an imaging apparatus configured to acquire imaging data of the object;
    a first controller communicatively connected with the illumination apparatus and the lighting sensor, and configured to:
    receive a control instruction signal from a processor; and
    control according to the control instruction signal, a second lighting parameter of the illumination light generated by the illumination apparatus according to the first lighting parameter, until the first lighting parameter of the ambient light is within a preset parameter range, wherein the second lighting parameter comprises an illumination light intensity and an illumination color temperature; and
    the processor communicatively connected with the imaging apparatus and the first controller, and configured to recognize the object according to the imaging data of the object under the ambient light within the preset parameter range, wherein the preset parameter range comprises a preset light intensity range and a preset color temperature range.

2. The system according to claim 1, wherein the illumination apparatus comprises:
    a first light emitting assembly configured to generate a first radiated light having a first color temperature and a first light intensity, wherein the first light intensity is adjustable;
    a second light emitting assembly configured to generate a second radiated light having a second color temperature and a second light intensity, wherein the second light intensity is adjustable, and the second color temperature is lower than the first color temperature; and
    a third light emitting assembly configured to generate a third radiated light having a preset color and a third light intensity, wherein the preset color and the third light intensity are adjustable, wherein the first light emitting assembly and the second light emitting assembly are configured for illumination, the third light emitting assembly is configured to indicate current status information.

3. The system according to claim 2, wherein the illumination apparatus further comprises:
one or more input ports each configured to receive a respective input signal; and
an output port electrically connected with at least one of the one or more input ports and configured to output an output signal, wherein the output signal comprises at least a portion of an input signal received by an input port electrically connected with the output port.

4. The system according to claim 3, wherein the output port is configured to be electrically connected with at least one input port of another illumination apparatus.

5. The system according to claim 3, wherein the one or more input ports comprises:
a first input port electrically connected with the first light emitting assembly and configured to receive a first power supply signal corresponding to the first light intensity, and the first light emitting assembly is configured to generate the first radiated light having the first light intensity according to the first power supply signal;
a second input port electrically connected with the second light emitting assembly and configured to receive a second power supply signal corresponding to the second light intensity, and the second light emitting assembly is configured to generate the second radiated light having the second light intensity according to the second power supply signal; and
a third input port electrically connected with the output port and the third light emitting assembly and configured to receive a color instruction signal corresponding to the preset color and a third power supply signal corresponding to the third light intensity, the output port is configured to output the color instruction signal as the output signal, and the third light emitting assembly is configured to generate the third radiated light having the preset color and the third light intensity according to the color instruction signal and the third power supply signal.

6. The system according to claim 5, wherein the illumination apparatus further comprises:
a second controller electrically connected with the third input port and configured to receive the color instruction signal and convert the color instruction signal into a color controlling signal and the second controller is further configured to relay the color instruction signal to the output port; and
a driver electrically connected between the second controller and the third light emitting assembly and configured to receive the color controlling signal, convert the color controlling signal into a color driving signal, and transmit the color driving signal to the third light emitting assembly.

7. The system according to claim 1, wherein the lighting sensor is disposed adjacent the imaging apparatus.

8. The system according to claim 1, wherein the lighting sensor comprises:
a color temperature sensor configured to acquire the ambient color temperature; and a light intensity sensor configured to acquire the ambient light intensity.

9. The system according to claim 1, further comprising:
a power supply apparatus electrically connected with the illumination apparatus and the first controller and configured to supply power to the illumination apparatus under the control of the first controller.

10. The system according to claim 9, wherein the power supply apparatus comprises:
a power supply assembly configured to generate a direct current power supply signal; and
a conversion assembly electrically connected with the power supply assembly and configured to convert the direct current power supply signal into a first power supply signal for supplying a first light emitting assembly, a second power supply signal for supplying a second light emitting assembly, and a third power supply signal for supplying a third light emitting assembly.

11. The system according to claim 10, wherein the conversion assembly is further configured to convert the direct current power supply signal into a fourth power supply signal for supplying the first controller; or
the conversion assembly is further configured to convert the direct current power supply signal to a fifth power supply signal for supplying the processor.

12. The system according to claim 10, wherein the conversion assembly comprises:
a first direct current converter configured to convert the direct current power supply signal into a first intermediate signal, wherein a level of the direct current power supply signal is higher than that of the first intermediate signal;
a first switch electrically connected with the first direct current converter and configured to control on and off of the first direct current converter;
a first voltage regulator electrically connected with the first controller and the first direct current converter and configured to regulate the first intermediate signal to the first power supply signal under the control of the first controller;
a second direct current converter configured to convert the direct current power supply signal into a second intermediate signal, wherein the level of the direct current power supply signal is higher than that of the second intermediate signal;
a second switch electrically connected with the second direct current converter and configured to control on and off of the second direct current converter;
a second voltage regulator electrically connected with the first controller and the second direct current converter and configured to regulate the second intermediate signal to the second power supply signal under the control of the first controller;
a third direct current converter configured to convert the direct current power supply signal into the third power supply signal, wherein the level of the direct current power supply signal is higher than that of the third power supply signal; and
a third switch electrically connected with the third direct current converter and configured to control on and off of the third direct current converter.

13. The system according to claim 10, wherein the conversion assembly further comprises a sampling circuit configured to sample the first power supply signal, the second power supply signal, and the third power supply signal to generate a sampled signal to be transmitted to the first controller.

14. The system according to claim 13, wherein the first controller is further configured to control the conversion assembly to adjust at least one of the first power supply signal, the second power supply signal, and the third power supply signal according to the first lighting parameter and the sampled signal.

15. The system according to claim 1, further comprising:
- a user interaction apparatus communicatively connected with the processor and configured to receive a user instruction and/or output at least a portion of feedback data generated by the system; and
- an object sensor configured to detect whether there is an object to be recognized, wherein the first controller is further configured to control the illumination apparatus to turn off when there is no object to be recognized.

16. An object recognition method, comprising:
- acquiring a first lighting parameter of an ambient light in a recognition environment in which an object is located;
- comparing the first lighting parameter with a preset parameter range;
- when the first lighting parameter is outside the preset parameter range, adjusting a second lighting parameter of an illumination light until the first lighting parameter is within the preset parameter range;
- acquiring imaging data of the object under the ambient light within the preset parameter range;
- recognizing the object according to the imaging data;
- determining an object recognition state;
- generating a color instruction signal corresponding to a preset color according to the object recognition state, wherein the preset color is configured to indicate the object recognition state; and
- generating a radiated light having the preset color according to the color instruction signal.

17. The object recognition method according to claim 16, further comprising:
- detecting whether there is an object to be recognized in the recognition environment; and
- when there is no object, controlling the illumination light to be turned off.

18. The object recognition method according to claim 16, wherein the first lighting parameter comprises an ambient light intensity and an ambient color temperature.

19. The object recognition method according to claim 16, wherein the second lighting parameter comprises an illumination light intensity and an illumination color temperature; and
- the preset parameter range comprises a preset light intensity range and a preset color temperature range.

\* \* \* \* \*